US011100929B2

(12) United States Patent
Bradley et al.

(10) Patent No.: US 11,100,929 B2
(45) Date of Patent: Aug. 24, 2021

(54) VOICE ASSISTANT DEVICES

(71) Applicants: Arm IP Limited, Cambridge (GB); Apical Limited, Cambridge (GB)

(72) Inventors: Daryl Wayne Bradley, Over (GB); Daren Croxford, Swaffham Prior (GB); Amyas Edward Wykes Phillips, Cambridge (GB); Robert Arnold Calico, III, Danville, CA (US)

(73) Assignees: Arm IP Limited, Cambridge (GB); Apical Limited, Cambridge (GB)

( * ) Notice: Subject to any disclaimer, the term of this patent is extended or adjusted under 35 U.S.C. 154(b) by 70 days.

(21) Appl. No.: 16/511,195

(22) Filed: Jul. 15, 2019

(65) Prior Publication Data

US 2020/0043489 A1 Feb. 6, 2020

(30) Foreign Application Priority Data

Aug. 1, 2018 (GB) ..................................... 1812549

(51) Int. Cl.
*G10L 21/00* (2013.01)
*G10L 25/00* (2013.01)
*G10L 15/22* (2006.01)
*G10L 15/30* (2013.01)

(52) U.S. Cl.
CPC .............. *G10L 15/22* (2013.01); *G10L 15/30* (2013.01); *G10L 2015/223* (2013.01); *G10L 2015/227* (2013.01)

(58) Field of Classification Search
CPC ... G10L 15/22; G10L 15/30; G10L 2015/223; G10L 2015/227; G06F 3/167

USPC .......................................................... 704/275
See application file for complete search history.

(56) References Cited

U.S. PATENT DOCUMENTS

| | | | |
|---|---|---|---|
| 2006/0280312 A1 | 12/2006 | Mao | |
| 2014/0330560 A1 | 11/2014 | Venkatesha et al. | |
| 2016/0193732 A1 | 7/2016 | Breazeal et al. | |
| 2017/0243578 A1 | 8/2017 | Son et al. | |
| 2018/0330589 A1* | 11/2018 | Horling | G06F 3/167 |
| 2019/0206395 A1* | 7/2019 | Aoki | G10L 15/30 |
| 2019/0310820 A1* | 10/2019 | Bates | H04N 21/4532 |

FOREIGN PATENT DOCUMENTS

WO 2018/183067 10/2018

OTHER PUBLICATIONS

Combined Search and Examination Report for GB Application No. 1812549.2 dated Feb. 4, 2019, 7 pages.
Examination Report for GB Application No. 1812549.2 dated Oct. 12, 2020, 3 pages.

* cited by examiner

*Primary Examiner* — Charlotte M Baker
(74) *Attorney, Agent, or Firm* — Nixon & Vanderhye P.C.

(57) ABSTRACT

A voice assistant device comprises an input to receive data defining an audio command; and processing circuitry to perform an operation defined by the audio command responsive to an activation of the voice assistant device; wherein the activation comprises determining presence of an activation source within an activation region from one or more sensors.

18 Claims, 5 Drawing Sheets

VOICE ASSISTANT DEVICES

BACKGROUND

Apparatus and methods for controlling voice assistant devices are herein described.

Voice assistant devices, also known as digital assistant devices, voice digital assistants, or voice controlled digital assistants, hereafter referred to as voice assistant devices, provide connected capabilities to allow a user to verbally interact with such devices to request information (locally or remotely via a cloud service) e.g. information from the internet, information from a user's calendar or appointment list, and control and interact with other connected devices such as smart lighting and/or smart security locks and the like. Such connected devices may communicate via a local point to point connection between devices, via a mesh connection, via a gateway, and/or via a cloud based service or remote connection, or a combination thereof. Typically, such devices are activated by one or more specific spoken words or phrases and followed by a spoke command that a user wishes the voice assistant device to perform.

SUMMARY

Techniques and features for improving the operation and interaction with such voice assistant devices are herein described.

According to a first aspect there is provided a voice assistant device to receive an audio command, the device comprising: an input to receive data defining an audio command; and processing circuitry to perform an operation defined by the audio command responsive to an activation of the voice assistant device; wherein the activation comprises determining presence of an activation source within an activation region from one or more sensors.

According to a second aspect there is provided a system comprising a plurality of audio receiving devices to receive audio commands from a user, the audio receiving devices distributable about a plurality of regions within an environment; and at least one voice assistant device capable of communication with at least a subset of the plurality of audio receiving devices to receive voice commands from audio receiving devices and perform the operation defined by the voice command.

According to third aspect there is provided a computer-implemented method to process an audio command from a user, the method comprising: receiving, at a voice assistant device, an audio command; and performing, at the voice assistant device, an operation defined by the audio command responsive to activation of the voice assistant device; wherein the activation comprises determining presence of an activation source within an operational region for the voice assistant device.

BRIEF DESCRIPTION OF THE DRAWINGS

These and other aspects will now be described, by way of example only, with reference to the following drawings in which.

DETAILED DESCRIPTION

The following embodiments are exemplary. Although the specification may refer to "an", "one", or "some" embodiment(s), this does not necessarily mean that each such reference is to the same embodiment(s), or that the feature only applies to a single embodiment. Single features of different embodiments may also be combined to provide other embodiments.

Figure 1:
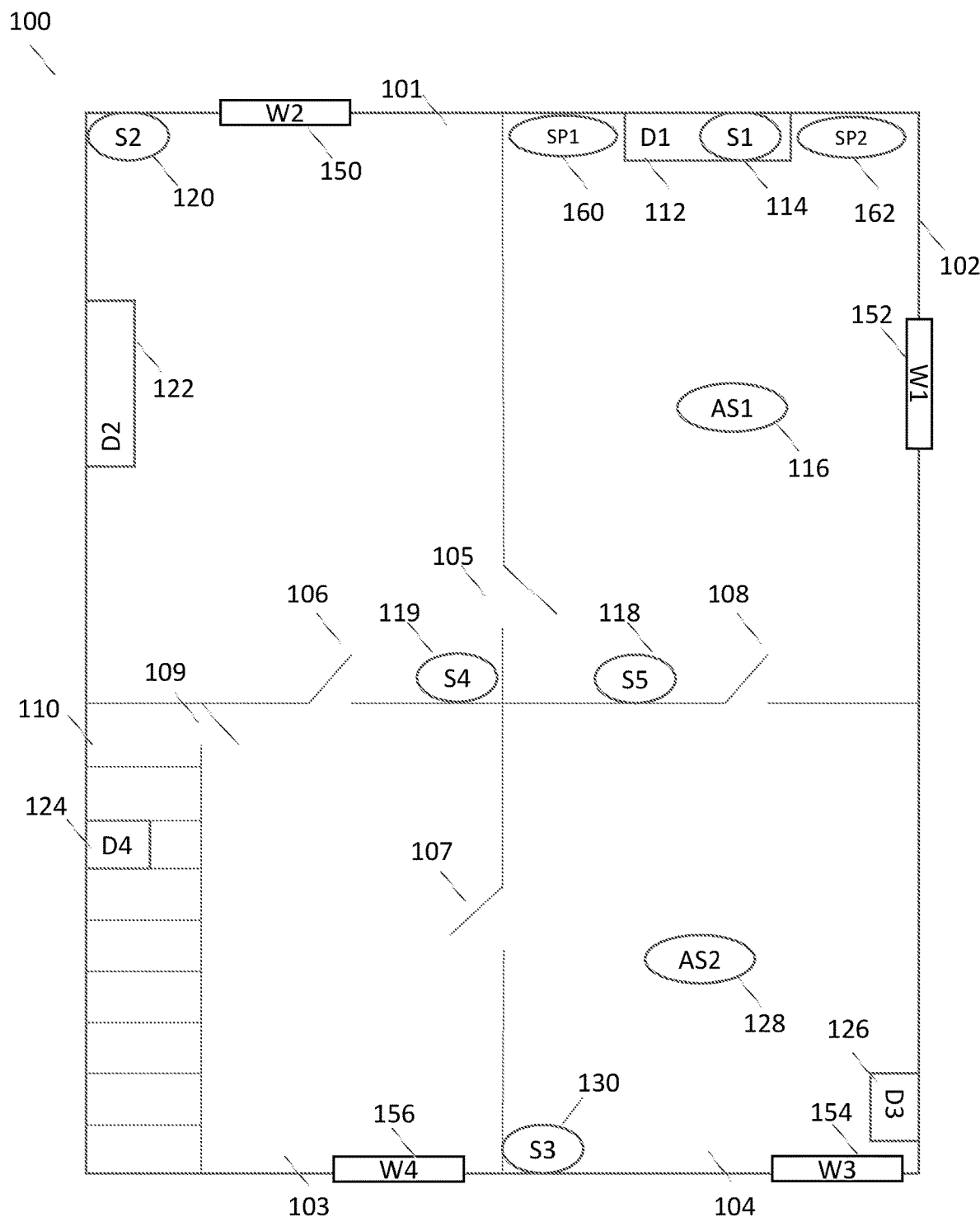
FIG. 1 shows an example environment with multiple voice assistant devices, sensors and activation sources.

FIG. 1 shows a plan view of an environment or property 100 having four rooms 101, 102, 103, 104.

Room 101 has window W2 (W2) and internal doors 105,106. Cited in the room is voice assistant device 122 (D2), sensor device 120 (S2) and sensor device 119 (S4). In this example sensor device S2 is a network/internet enabled camera capable of recording or streaming video (locally, or remotely) and may be connected to a remote cloud monitoring service. In some embodiments S2 may also be capable of object and/or user recognition, either locally, or via a connected cloud service such that a user or object can be identified. Sensor device S4 is a PIR sensor.

Room 102 has window W1 and internal doors 105, 108. Cited in the room is voice assistant device 112 (D1) with integrated sensor 114 (S1), a further sensor device 118 (S5) and two speakers 160, 162 (SP1, SP2 respectively). In this room, by way of example, sensor device S5 includes a PIR sensor and sensor S1 is a camera integrated into voice assistant device D1.

Room 103 has external door W4, internal doors 107,106 and under staircase storage cupboard 110 accessed by door 109. A voice assistant device 124 (D4) is located in the storage cupboard. In normal operation, voice assistant device D4 is unable to hear many audio commands from a user within the property due to its enclosed location.

Room 104 has window W3 and internal doors 107,108. Cited in the room is voice assistant device 126 (D3) and a network/internet enabled camera sensor device 130 (S3). This camera also supports depth sensing capabilities, e.g. via IR illumination and may therefore be able to gather information on the surrounding room, such as wall positioning and positioning of users in the room.

FIG. 1 also shows two different activation sources 116, 128 (AS1 and AS2 respectively) which may be a user/resident of the property of FIG. 1 or device associated with user. In this example, AS1 is a user or resident of the property and AS2 is a device that controllable or owned by a second resident of the property, such as a smart watch or other connected device (mobile phone for example or personal location device). In other embodiments it will be appreciated that AS2 may be associated with user AS1 and as such, any time and presence detection is performed, user AS1 may be deemed to be present in both rooms 102 and 104. The voice assistant devices may be configured to be activated to perform an operation by either user AS1, device AS2, both, or may vary on a room by room/voice assistant device by device basis. In many example embodiments the process of activating a voice assistant device may be a combination of detection of AS1 or AS2 and detecting an audio command, such as a spoken command, from a user within the same room. However, in variants of this, as set out later, presence detection may only be needed dependent on the arrangement and configuration of devices throughout the environment of FIG. 1.

Figure 2:
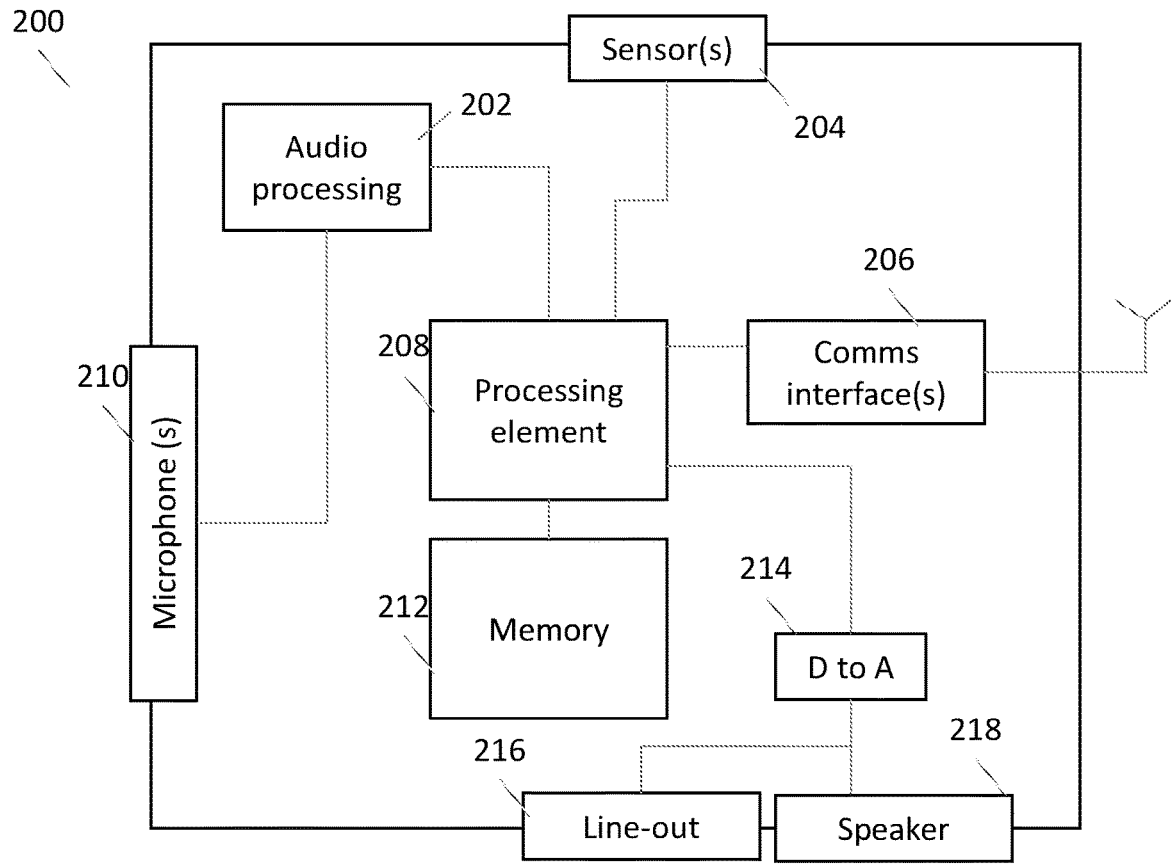
FIG. 2 shows an illustrative block diagram of a voice assistant device.

FIG. 2 shows an example block diagram of a voice assistant device of FIG. 1. The voice assistant device 200 comprises a processing element 208 and memory 212 to perform compute operations and to store data respectively. Audio processing circuitry 202 processes audio inputs and converts an audio input from microphone 210 into data for processing by the processing element 208. In this exemplary embodiment, the voice assistant device also includes a further sensor 204 (much like voice assistant D1 in FIG. 1) which may be a camera, PIR sensor, or another form of sensor capable of detecting presence of an activation source (user or object). The voice assistant 200 also includes a speaker output 218, an audio line-out 216 to permit a user to connect the device to another audio output source, and a communications interfaces 206 (wired, or wireless, or both) for communication with other devices, a local network and/or cloud service to process audio commands received from a user. In some embodiments there may be multiple communications interfaces, e.g. Wi-Fi, Bluetooth, and/or cellular enabling the device to communicate with different devices supporting different communications protocols and standards.

Figure 3:
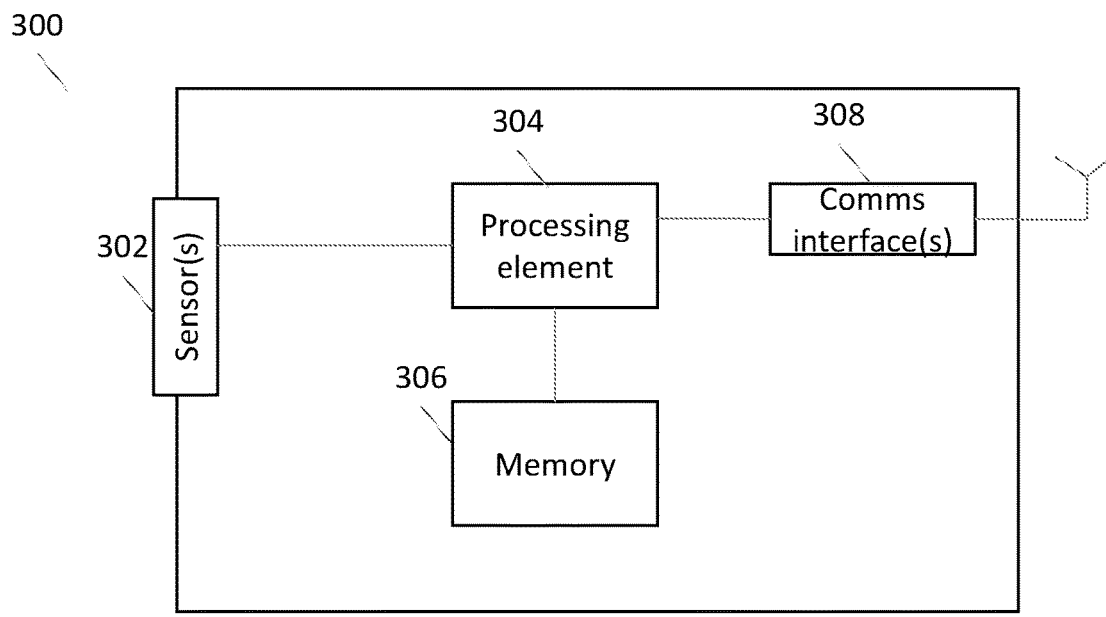
FIG. 3 shows an illustrative block diagram of a sensor node device.

FIG. 3 shows an example block diagram of a sensor device 300, such as those cited throughout the rooms shown in FIG. 1. The sensor device includes one or more sensors 302, such as a camera sensor, audio mic, PIR sensor or other sensor that may enable detecting of presence of an activation source (user or object). The sensor device 300 also include a communications interface 308 to enable communication with a local network (e.g. via a Wi-Fi or wired router) and/or with a voice assistant device or other sensor device (e.g. via point to point or mesh network arrangement). In some embodiments there may be multiple communications interfaces, e.g. Wi-Fi, Bluetooth, and/or cellular enabling the device to communicate with different devices supporting different communications protocols and standards.

Figure 4:
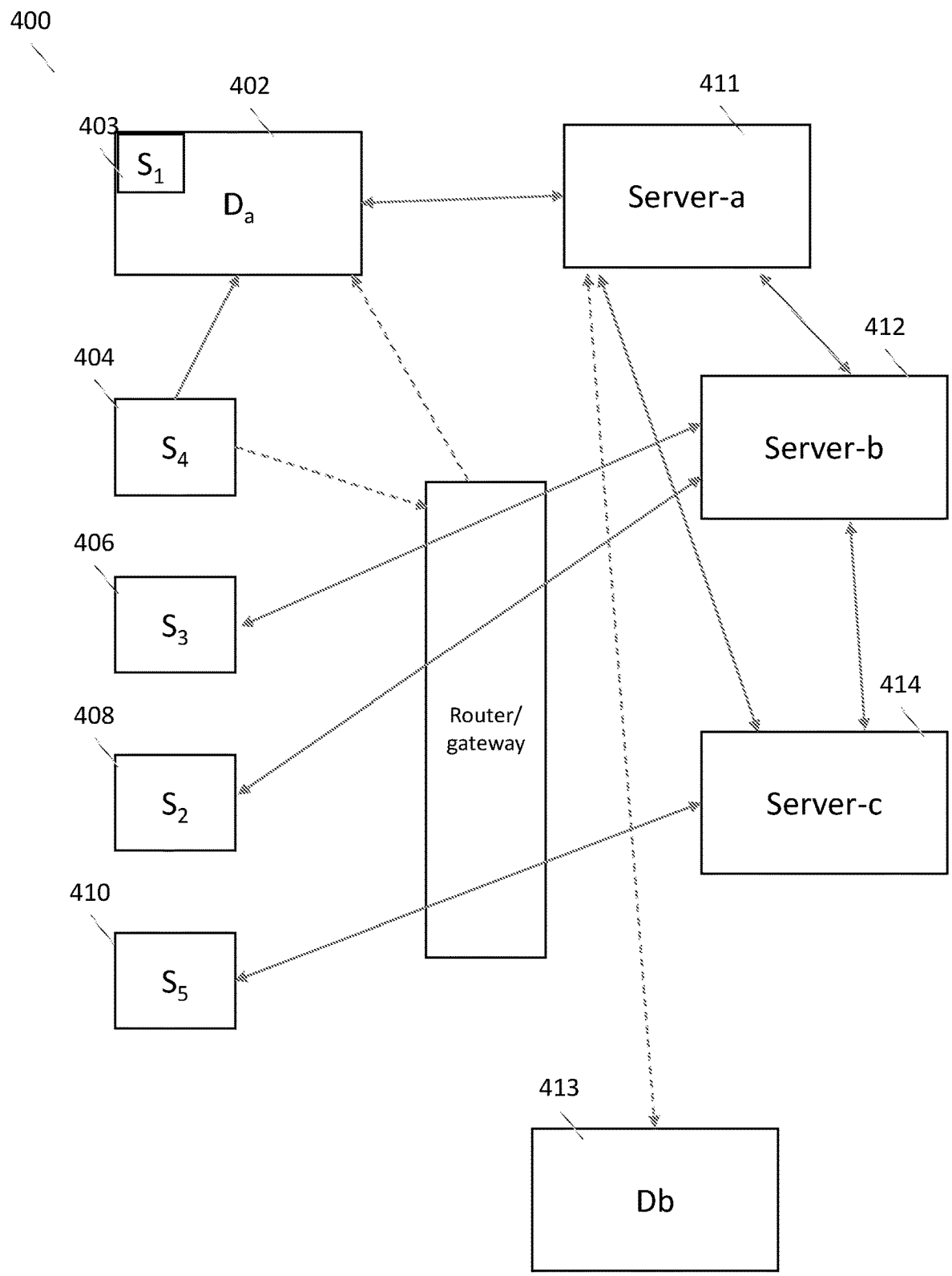
FIG. 4 shows an example network of devices from FIGS. 1 and 2.

Referring to FIG. 4, this shows the various methods by which a sensor device may communicate with a voice assistant device and is applicable to any of the sensor devices or voice assistant devices illustrated in FIG. 1 and throughout this specification. In the example arrangement in FIG. 4, sensor S1 is integral to voice assistant device Da (much like voice assistant device D1 in FIG. 1) and as such, may use the sensor data directly. Sensor S4, which in this example is a PIR sensor communicates directly (or indirectly via a local router/gateway, as illustrated by the dotted line in FIG. 4) with voice assistant Da, which may be, for example, via a Bluetooth or other local wireless/wired connection.

Sensor devices S2 and S3 in FIG. 4 are two network connected web cameras registered with a video streaming/capture service and capable of communicating a video feed to remote server Server-b.

Sensor device S5, which in this example is a network connected PIR sensor, communicates with Server-c (which may, for example, provide a security monitoring service).

Any or all of Sensors S2, S3, S4, S5 may connect to their respective destinations via a gateway or router device or alternatively, via a mesh network.

Figure 5:
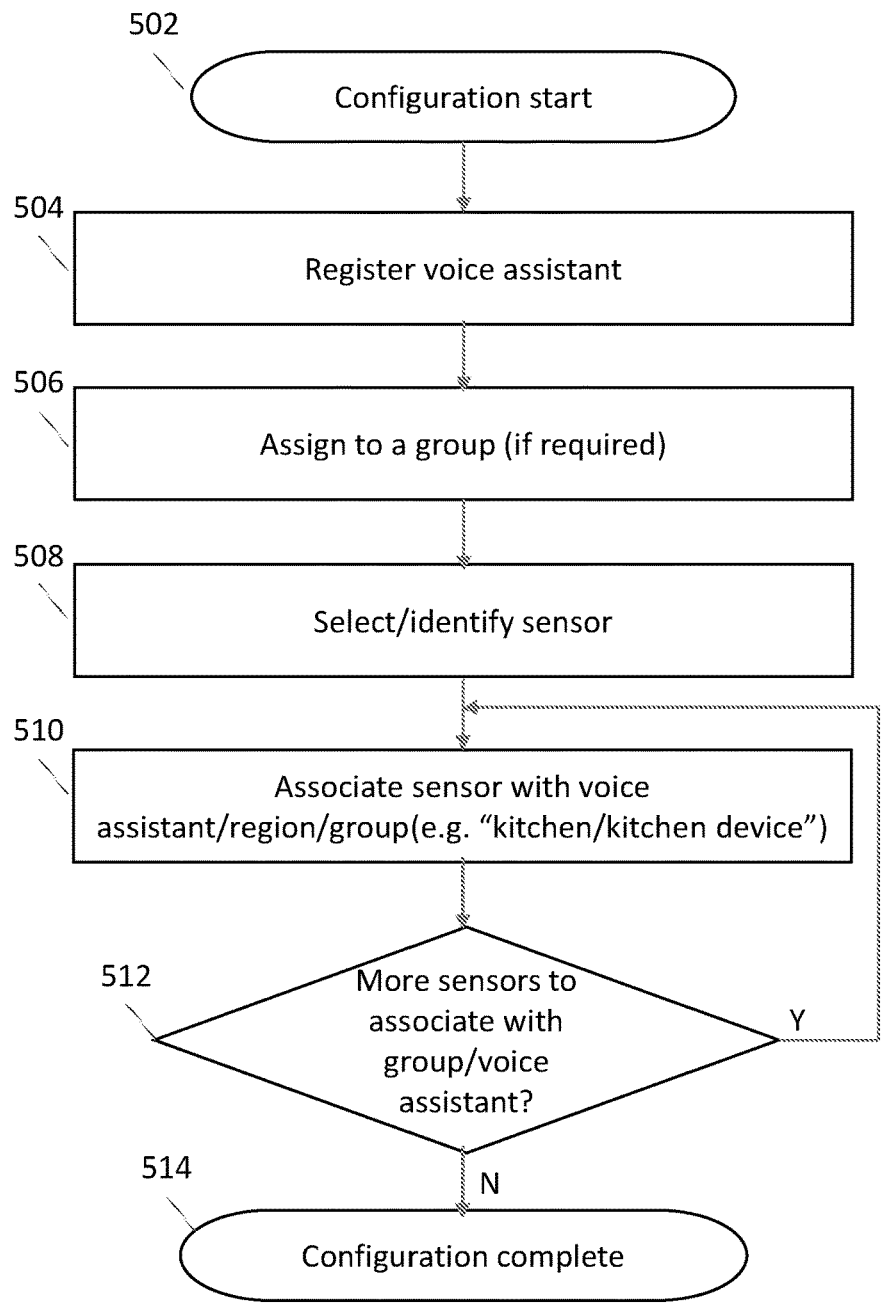
FIG. 5 shows a flowchart setting out one method of configuring devices.

Three cloud servers Server-a, Server-b, Server-c are also shown in FIG. 4. Server-a provides remote processing capabilities for voice assistant device Da. Server-b provides video capture and monitoring services for network camera sensor devices S2, S3. Server-c provides a service to communicate and monitor data from PIR sensor device S5. A user/owner of sensor devices S2, S3, may enable data from the service used on Server-b, to be communicated to Server-a to facilitate use of data across services and, in this example, enable the voice assistant device and its supporting service on Server-a to use the video data stream information. In some embodiments, this may be via established APIs that one or both of the service providers for each service have setup to enable interoperability and transfer of data. In some implementations, Server-b and Server-c may also communicate such that the capture and monitoring service can be enhanced via gathering data from other devices in an environment. Also shown in FIG. 5 is a further voice assistant device Db, and this is described later in this specification.

In many existing systems, when a voice assistant device is activated by detecting a specific or shortlist of spoken keywords (herein referred to as audio activations), subsequent commands will be performed, irrespective of the source of the audio activation. In the arrangements disclosed herein, in use the connectivity between the sensor devices and voice assistant device as illustrated in FIG. 4 enables a voice assistant device to determine when a user is present in a specific room (activation region) in the environment of FIG. 1 in which the voice assistant is placed via detecting the presence of user in such a space. When a user attempts to activate a voice assistant device via a spoken activation word (or other means), this prevents a false activation of one or more voice assistant devices occurring if, for example, both voice assistant device D2 in room 101 and voice assistant device D1 in room 102 of FIG. 1 both hear a user stood in room 102 near to door 105. Via the arrangement of sensor devices, it is possible to determine in which room a user is positioned and thereby ensure that only the voice assistant device local to that room is activated and thereby prevent multiple activations occurring as a result of the same user. It will be appreciated however that in some embodiments there may be benefits in activating a voice sensor in another room, rather than one in the locally detected room if such devices provide different capabilities or not all rooms have a voice assistant device. It will also be appreciated that further sensor capabilities of the voice assistant device itself may also be used to provide such a determination. A further benefit of enabling presence detection in such a way is that it may enable simpler or locality based commands to be spoken by a user, e.g. when stood in room 102, rather than initiating an audio command such as "turn on lights in room 102", the user many instead say "turn on lights" and the presence detection will identify the relevant room to perform the operation.

Referring again to FIG. 1, the proximity of window W3 to voice assistant device D3 may mean that it is possible for an unknown third party to shout a command through the window at voice assistant device D3 resulting in an action being performed inside the property (e.g. a light being turned on) or personal information being obtained (e.g. details of a calendar or appointment schedule). The presence detection abilities of sensor device S3 may be leveraged to determine that no user is present in room 104 and thereby ensure no operation is performed by the voice assistant device D3. Depth sensing data from sensor device (camera) S3 may further yield useful information to determine no user within the activation region. If the relative arrangements of S3 and W3 is different such that sensor device S3 points towards window W3, again depth sensing data may also support the determination that a user detected outside, beyond window 3, is not within the necessary activation region of room 104.

In some embodiments the sensor device, and/or their associated cloud service, may be able to distinguish between users, as may the voice assistant device (either via other inbuilt sensors, e.g. camera, via determining via voice characteristics, waveform or speech analysis, or via the use of different activation keywords). The ability to identify a specific user then enables a determination to be made that the audio activation and detection of presence are both as a result of the same user. This is particularly beneficial in some environments in which there may be multiple users present, such as a family household which people present in different rooms.

Such capabilities may also be used to inhibit a particular user, or unknown user, from activating a voice assistant device—a family may wish to prevent one or more younger family members from activating a voice assistant device at any time, or during certain period of the day, or activation may only be limited to certain previously registered persons and an unknown user may be prevented from performing any operations. Such capabilities may also be used to limit or reduce the capabilities of the voice assistant device, for example, to prevent access to personal information (e.g. a connected calendar, email, shopping) and/or restricted functionality local to the property or environment. As a further example, some smart thermostat devices provide an ability to detect when a user is in a property via proximity sensors on the smart thermostat device, and/or via the use of location service on a cell phone in possession of a user. This information may be used to determine that a user is away from a property and place the heating or cooling of the property of FIG. 1 into an 'away' status. The voice assistant device may be able to link to the information provided by the smart thermostat and place the voice assistant device into an away mode which would prevent other users (e.g. a cleaner, visitor, or any other unapproved third party) from performing an operation via the voice assistant device. In a variant of this, rather than inhibiting an action being performed, the voice assistant device may issue a challenge/question to the user, such as asking for a special passphrase and if the correct response is received, then permitting use, or restricted use, of the voice assistant device.

Whilst many voice assistant devices require an audio activation signal (one or more keywords) to initiate an operation based on subsequent received commands or spoken words to that audio, the capabilities disclosed herein may, in some embodiments, obviate the need for this if a user wishes to enable any spoken command to be processed and/or communicated to a remote server, or place their voice assistant device in a configuration to enable this. Such a mode may be considered, for example, a 'continuous listening mode' and be useful in some situations to enable a more seamless interaction without the need to repeat activation keywords or phrases. Such a configuration in some embodiments may also be restricted or enabled only for one or more specifically identified users, which may be recognised and communicated to the voice assistant device by a sensor and their associated server determining and recognising a specific person.

Referring again to FIG. 4, a further voice assistant device Db 413 is also shown. To enable the arrangement shown in FIG. 1 to operate, different sensor devices may be associated or grouped with different voice assistant devices to ensure the presence of a user is communicated to and/or triggers the appropriate voice assistant device. User presence may be determined on a voice assistant device itself on receipt of communicated data, or it may be determined at one of the remote cloud servers, or a combination of both. FIG. 5 illustrates one method of configuring this.

In FIG. 5, at step 502 a voice assistant device is turned on and placed in a configuration mode. A user or installer may control and configure either via the voice assistant device directly, indirectly via another device in communication with the voice assistant device, via a software application or via a web page. At step 504 the voice assistant device is registered with a voice assistant service, such as that provided by cloud service/Server-a in FIG. 4. As part of the initialisation or commissioning process, the voice assistant device may be assigned to a group or region to be used for activation, for example "kitchen group, living room group or bedroom group" (or a new group created if it does not yet exist) and as such the group may be associated with a room in a property for example to define an activation region. However, the group or region may include multiple rooms or be a specific geographical region and devices may be assigned or associated with multiple groups. At step 508 the user or installer selects a sensor device from a list of devices identified within the property or environment and at step 510 assigns the sensor to the corresponding group to which the voice assistant is assigned such that the voice assistant device knows it can use the data from the assigned sensor device to determine presence. If the sensor device is newly installed, it will be appreciated that it may also first require commissioning steps to be followed to make the sensor device available and visible to the commissioning software (e.g. via the servers of FIG. 4 communicating data) used by the voice assistant device. This process is repeated until all sensor devices to be used with the voice assistant device have been assigned to the same group and then configuration/commissioning is complete for that voice assistant device. The same process can then be followed for other voice assistant devices.

In variants of this process, sensor devices may already be assigned to specific groups and as such, when the voice assistant device is assigned to the same group then no further configuration is required as all the grouping information necessary to perform the presence detection is available, which makes the steps of commissioning faster and more efficient. If the voice assistant device includes presence sensing capabilities that it may not be necessary to perform the grouping process and by default the sensing capabilities will perform presence detection for that voice assistant device.

Considering the environment of FIG. 1, the following groups may be created, which in turn, result in four different activation regions for the environment of FIG. 1.

Kitchen (101): Voice assistant D2, sensor device S2

Living room (102): Voice assistant D1 (sensor device S1 implicitly assigned as integral to D1), senor device S5

Dining room (104): Voice assistant D3, sensor device S3

Entrance hall (103): Voice assistant device D4

Figure 6:
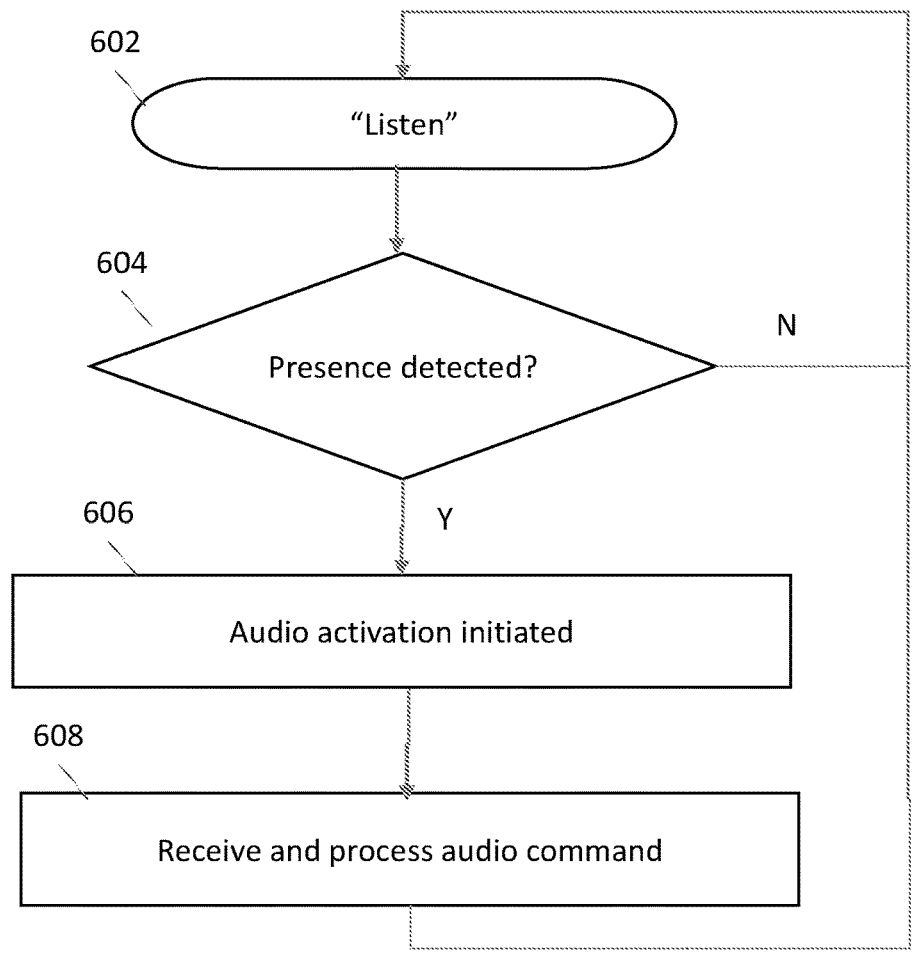
FIG. 6 shows a flowchart setting out one method of activating a voice assistant device.

Referring now to FIG. 6, in use, at step 602 a voice assistant device (D1, D2, D3 or D4 in FIG. 1) listens for an audio activation signal, such as a specific phrase or sound (e.g. "activate"). On detection of the specific phrase the presence of a user activation region (e.g. same room) is determined at step 604 based on any sensor data associated with the voice assistant device/device group. If no presence is detected, or in more complex systems, the presence of a different user to one providing the audio activation signal or a determination that an authorised user is not in the activation region, then no action is performed and the voice assistant device reverts to its listening state 602 again. In some embodiments the voice assistant device may emit a notification that no processing has been performed such as an audio and/or visual signal If presence is detected, or in more complex systems, the correct user is detected, then the voice assistant is activated at step 606 (it may again emit an audio and/or visual signal as confirmation), and then at step 608 on receipt of an audio command from a user, the command is processed, either locally or via communicating the received audio to a remote server for processing.

As previously described, in many embodiments sensor devices will be used to detect presence of a user. Presence detection may be provided by detecting the presence of any user (e.g. via a PIR sensor), or camera and resulting object recognition to identify any person, and/or detecting specific characteristics of a user, e.g. via image recognition, biometric data, or other forms of analysis to identify a specific or defined person or persons.

A sensor device may have been deployed in the environment for other reasons originally, rather than enabling presence detection for the voice assistant device. For example, as previously mentioned with reference to FIG. 1, sensor devices S2, S3 are cloud connected webcams capable of recording or streaming video footage or capturing photos/video stills and may have been originally commissioned by the owner of the property as a security device—the capabilities of such sensor devices are leveraged by a voice assistant device to facilitate presence detection.

It will be further appreciated that whilst in many embodiments a person/user will be the source of activation, other activation sources may be used, for example the positioning of a mobile phone device owned by a user or a smartwatch, or other devices capable of providing location identification. Such devices may, for example, act as presence beacons and obviate the need for use of connected web cameras or PIR sensor devices for example. Any device with audio output capabilities may also be of particular benefit to someone who may have poor speech and finds interacting with voice assistant devices problematic. For such a user, having a device generate the spoken words may be particularly useful in being able to interact with the environment via the voice assistant device. For example, a user might be able to move from room to room, with a communicator device they use to interact with other persons being used to determine presence; and that device may also be configured to output an activation keyword or phrase, together with a subsequent audio command. It will however be appreciated that in other embodiments such a user may be detected via the other presence detection techniques described herein and any audio command output from such a device may then be associated with a particular user or owner of such a device.

Referring again to FIG. 1, as previously described, voice assistant device D4 124 is cited in a storage cupboard (as the user prefers not to have such an item on display) and as a result, in normal operation, the voice assistant device D4 is unable to hear many audio commands from a user due. In a variant of the device operation previously described, D4 may be configured as master device, and the other voice assistant devices D1, D2 and D3 as slave devices. In this arrangement, when any of D1, D2 or D3 are activated, rather than communicating data directly to a remote server, data is instead sent to the master device D4, and therefore the complexity of devices D1, D2 and D3 may be reduced and in some embodiments they may simply be audio receiving devices/connected microphones (without any activation technology at all) to route audio through to the master device D4. Alternatively, they may be no need for any slave voice assistant devices at all and sensors devices themselves, such as the connected webcams may communicate audio to voice assistant D4, thereby providing both presence detection and audio redirection to the master voice assistant device.

In environments or even activation regions within an environment in which presence detection is not implemented, this may prevent multiple devices from receiving the same command simultaneously and such devices processing the same command—a master device will identify the same repeated command being received within a time window and may perform the operation defined by the audio command only once, or check with a user if the same command is to be processed multiple times. There may also be multiple master voice assistant devices and each may be assigned to a group, together wither other devices, according to the grouping process as previously described with reference to FIG. 5, resulting in each voice assistant communicating with a subset of devices. These master voice assistant devices may also communicate with one another to determine which should perform the requested audio command, if so desired and thereby provide another mechanism to avoid the same command being processed by multiple devices at the same time or within a predetermined window of time.

No doubt many other effective alternatives will occur to the skilled person. It will be understood that the invention is not limited to the described embodiments and encompasses modifications apparent to those skilled in the art lying within the spirit and scope of the claims appended hereto.

Throughout the description and claims of this specification, the words "comprise" and "contain" and variations of the words, for example comprising" and "comprise", means "including but not limited to, and is not intended to (and does not) exclude other moieties, additives, components, integers or steps.

Throughout the description and claims, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example, of the invention are to be understood to be applicable to any other aspect, embodiment or example described herein unless incompatible therewith. Embodiments may include one or more of the following features:

The activation source may comprise a user or a device controllable by the user, and in embodiments activation may comprise determining physical presence of the activation source.

The activation as described herein may further comprise determining presence of the activation source in combination with receipt of an audio activation via the input. The activation may further comprise determining if both the audio activation and the presence are associated with the same activation source, and the activation is responsive to both the audio activation and presence resulting from the same activation source.

In embodiments at least one of the one or more sensors is integral to the voice assistant device and the activation further may comprise receiving data defining presence of the activation source within the activation region. At least one of the one or more sensors may be remote to the voice assistant device and the activation may further comprise receiving a communication from the remote sensor comprising presence data defining presence of the activation source within the activation region. The one or more sensors to provide the activation may be from a group of devices assigned to the activation region.

In embodiments the voice assistant device may be configured to communicate with a remote service to identify and determine the one or more sensors from the group of devices to provide the activation.

In embodiments the activation source may comprise at least one of the one or more sensors.

In embodiments the activation may be responsive to detection of the presence of the activation source via one or more characteristics of the activation source. The activation may further comprise detecting presence of a defined activation source.

In embodiments, responsive to determining the defined activation source is absent from the activation region the voice assistant device may be inhibited from activating for any other activation source.

In embodiments, responsive to receiving the audio command the voice assistant device may output a question, and responsive to receiving a correct response to the question, the voice assistant device may perform the operation defined by the audio command. In some embodiments, the voice assistant device may be configured to output the question responsive to a determination that a defined activation source is not detected within the environment and/or activation region.

In embodiments, responsive to receiving a plurality of the same audio command within a predetermined time window, the voice assistant device may ignore repeated requests to perform the same operation defined by the voice command or query if the same operation should be repeated.

In embodiments the input may be a communication input to receive a communication from a secondary audio receiving device to receive and communicate the audio command to the voice assistant device. The audio command may be a spoken command, which may be initiated by a user or may be another form of audio, for example a series of sounds other than a spoken command and may be generated by a device with an audio output.

In some embodiments there may be multiple voice assistant device and each may be in communication with a subset of the audio receiving devices; such subsets may be overlapping or may be proper subsets. If the sets overlap, the voice assistant devices may be configured to communicate with one another (or one may be a master and the others slaves) to determine which should perform the operation defined by the audio command.

Further embodiments may relate to the following numbered clauses:

1. A voice assistant device to receive an audio command, the device comprising: an input to receive data defining an audio command; and processing circuitry to perform an operation defined by the audio command responsive to an activation of the voice assistant device; wherein the activation comprises determining presence of an activation source within an activation region from one or more sensors.

2. A voice assistant device as described in clause 1, wherein the activation source comprises a user or a device controllable by the user.

3. A voice assistant device as described in clause 1 or 2, wherein the activation further comprises determining presence of the activation source in combination with receipt of an audio activation via the input.

4. A voice assistant device described in any preceding clause, wherein the activation further comprises determining if both the audio activation and the presence are associated with the same activation source, and the activation is responsive to both the audio activation and presence resulting from the same activation source.

5. A voice assistant device as described in any preceding clause, wherein at least one of the one or more sensors is integral to the voice assistant device and the activation further comprises receiving data defining presence of the activation source within the activation region.

6. A voice assistant device as described in any preceding clause, wherein at least one of the one or more sensors are remote to the voice assistant device and the activation further comprises receiving a communication from the remote sensor comprising presence data defining presence of the activation source within the activation region.

7. A voice assistant device as described in clause 6, wherein the one or more sensors to provide the activation are from a group of devices assigned to the activation region.

8. A voice assistant device as described in clause 7, wherein the voice assistant device is configured to communicate with a remote service to identify and determine the one or more sensors from the group of devices to provide the activation.

9. A voice assistant device as described in any preceding clause, wherein the activation source comprises at least one of the one or more sensors.

10. A voice assistant device as described in any preceding clause, wherein the activation is responsive to detection of the presence of the activation source via one or more characteristics of the activation source.

11. A voice assistant device as described in any preceding clause, wherein the activation further comprises detecting presence of a defined activation source.

12. A voice assistant device as described in clause 8, wherein responsive to determining the defined activation source is absent from the activation region the voice assistant device is inhibited from activating for any other activation source.

13. A voice assistant device as described in any preceding clause, wherein responsive to receiving the audio command the voice assistant device is configured to output a question, and responsive to receiving a correct response to the question, the voice assistant device is configured to perform the operation defined by the audio command.

14. A voice assistant device as described in clause 13, where the voice assistant device is configured to output the question responsive to a determination that a defined activation source is not detected within the environment and/or activation region.

15. A voice assistant as described in any preceding clause, wherein responsive to receiving a plurality of the same said audio command within a predetermined time window, the voice assistant device is configured to ignore repeated requests to perform the same operation defined by the voice command or query if the same operation should be repeated.

16. A voice assistant device as described in any preceding clause, wherein the input comprises a communication input to receive a communication from a secondary audio receiving device to receive and communicate the audio command to the voice assistant device.

17. A voice assistant device as described in any preceding clause, wherein the audio command comprises a spoken command.

18. A voice assistant device as described in any preceding clause, wherein the audio command is initiated by a user.

19. A voice assistant device as described in any preceding clause, wherein the activation comprises determining physical presence of the activation source.

20. A system comprising a plurality of audio receiving devices to receive audio commands from a user, the audio receiving devices distributable about a plurality of regions within an environment; and at least one voice assistant device according to clause 16 capable of communication with at least a subset of the plurality of audio receiving devices to receive voice commands from audio receiving devices and perform the operation defined by the voice command.

21. A system as described in clause 20, wherein the activation comprises device detecting the presence of the activation source.

22. A system as described in clause 20 or 21, further comprising a further voice assistant device in communication with at least a subset of the audio receiving devices.

23. A system as described in clause 20, 21 or 22 wherein the voice assistant device and further voice assistant device are configured to communicate to determine which of the further voice assistant device and further voice assistant device should perform the operation defined by the audio command.

24. A computer-implemented method to process an audio command from a user, the method comprising: receiving, at a voice assistant device, an audio command; and performing, at the voice assistant device, an operation defined by the audio command responsive to activation of the voice assistant device; wherein the activation comprises determining presence of an activation source within an operational region for the voice assistant device.

The invention claimed is:

1. A voice assistant device to receive an audio command, the device comprising:
   an input to receive data defining an audio command; and
   processing circuitry to perform an operation defined by the audio command responsive to an activation of the voice assistant device;
   wherein the activation comprises determining presence of an activation source within an activation region from one or more sensors, the voice assistant device configured to enter a restricted mode responsive to a determination that the activation source is not within the activation region; and
   wherein, when the voice assistant device is in the restricted mode, responsive to receiving the audio command the voice assistant device is configured to request a passphrase from a source of the audio command, and responsive to receiving a correct passphrase from the source of the audio command, the voice assistant device is configured to perform the operation defined by the audio command.

2. A voice assistant device as claimed in claim 1, wherein the activation source comprises a user or a device controllable by the user.

3. A voice assistant device as claimed in claim 1, wherein the activation further comprises determining presence of the activation source in combination with receipt of an audio activation via the input.

4. A voice assistant device as claimed in claim 1, wherein the activation further comprises determining if both the audio activation and the presence are associated with the same activation source, and the activation is responsive to both the audio activation and presence resulting from the same activation source.

5. A voice assistant device as claimed in claim 1, wherein at least one of the one or more sensors is integral to the voice assistant device and the activation further comprises receiving data defining presence of the activation source within the activation region.

6. A voice assistant device as claimed in claim 1, wherein at least one of the one or more sensors are remote to the voice assistant device and the activation further comprises receiving a communication from the remote sensor comprising presence data defining presence of the activation source within the activation region.

7. A voice assistant device as claimed in claim 6, wherein the one or more sensors to provide the activation are from a group of devices assigned to the activation region.

8. A voice assistant device as claimed in claim 7, wherein the voice assistant device is configured to communicate with a remote service to identify and determine the one or more sensors from the group of devices to provide the activation.

9. A voice assistant device as claimed in claim 1, wherein the activation source comprises at least one of the one or more sensors.

10. A voice assistant device as claimed in claim 1, wherein the activation is responsive to detection of the presence of the activation source via one or more characteristics of the activation source.

11. A voice assistant device as claimed in claim 1, wherein the activation further comprises detecting presence of a defined activation source.

12. A voice assistant device as claimed in claim 11, wherein responsive to determining the defined activation source is absent from the activation region the voice assistant device is inhibited from activating for any other activation source.

13. A voice assistant device as claimed in claim 1, wherein responsive to receiving a plurality of the same said audio command within a predetermined time window, the voice assistant device is configured to ignore repeated requests to perform the same operation defined by the audio command or query if the same operation should be repeated.

14. A voice assistant device as claimed in claim 1, wherein the input comprises a communication input to receive a communication from a secondary audio receiving device to receive and communicate the audio command to the voice assistant device.

15. A voice assistant device as claimed in claim 1, wherein the audio command comprises a spoken command or is initiated by a user.

16. A voice assistant device as claimed in claim 1, wherein the activation comprises determining physical presence of the activation source.

17. A system comprising a plurality of audio receiving devices to receive audio commands, the audio receiving devices distributable about a plurality of regions within an environment; and at least one voice assistant device according to claim 14 capable of communication with at least a subset of the plurality of audio receiving devices to receive voice commands from audio receiving devices, wherein responsive to receiving a voice command the voice assistant device is configured to request a passphrase from a source of the voice command, and responsive to receiving a correct passphrase from the source of the voice command, the voice assistant device is configured to perform the operation defined by the voice command.

18. A computer-implemented method to process an audio command, the method comprising:
   receiving, at a voice assistant device, an audio command;
   determining presence of an activation source within an operational region for the voice assistant device;

entering a restricted mode responsive to a determination that the activation source is not within the operational region;

when the voice assistant device is in the restricted mode, requesting a passphrase from a source of the audio command in response to receiving the audio command; and performing, at the voice assistant device, an operation defined by the audio command responsive to receiving a correct passphrase from the source of the audio command.

\* \* \* \* \*